United States Patent
Ikezawa

(10) Patent No.: US 7,116,085 B2
(45) Date of Patent: Oct. 3, 2006

(54) DC-DC CONVERTER

(75) Inventor: Katsuya Ikezawa, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/015,624

(22) Filed: Jun. 7, 2005

(65) Prior Publication Data
US 2005/0206354 A1    Sep. 22, 2005

(30) Foreign Application Priority Data
Dec. 25, 2003    (JP)    ............................. 2003-429254

(51) Int. Cl.
*G05F 1/613* (2006.01)
(52) U.S. Cl. .................. 323/225; 323/222; 323/224; 323/259; 323/271
(58) Field of Classification Search ........ 323/222–225, 323/232, 259, 282, 284, 285; 363/271, 344
See application file for complete search history.

(56) References Cited

U.S. PATENT DOCUMENTS

| | | | | |
|---|---|---|---|---|
| 5,734,258 A | * | 3/1998 | Esser | ........................ 323/224 |
| 5,889,392 A | * | 3/1999 | Moore et al. | ................ 323/282 |
| 6,166,527 A | * | 12/2000 | Dwelley et al. | ............. 323/222 |
| 6,348,779 B1 | * | 2/2002 | Sluijs | .......................... 323/222 |
| 6,765,371 B1 | * | 7/2004 | Kataoka | ...................... 323/222 |
| 6,788,033 B1 | * | 9/2004 | Vinciarelli | ................... 323/225 |
| 6,812,676 B1 | * | 11/2004 | Tateishi | ....................... 323/225 |
| 6,977,488 B1 | * | 12/2005 | Nogawa et al. | ............. 323/271 |
| 2005/0093526 A1 | * | 5/2005 | Notman | ....................... 323/282 |

* cited by examiner

*Primary Examiner*—Gary L Laxton
(74) *Attorney, Agent, or Firm*—Carlton H. Hoel; W. James Brady; Frederick J. Telecky, Jr.

(57) ABSTRACT

The objective of this invention is to reduce the current flowing through the inductance element in a step-up/step-down DC—DC converter and to control the ripple in the output voltage. In the DC—DC converter, four states, that is, the first state [1] of (M1, M2)=(off, on) and (M3, M4)=(on, off), the second state [2] of (M1, M2)=(on, off) and (M3, M4)=(off, on), the third state [3] of (M1, M2)=(on, off) and (M3, M4)=(on, off), and the fourth state [4] of (M1, M2)=(off, on) and (M3, M4)=(off, on) are repeated in a prescribed order, preferably in the order . . . [1]→[4]→[2]→[3]→[1] . . . or . . . [1]→[3]→[2]→[4]→[1] . . . .

13 Claims, 8 Drawing Sheets

| | $M_1$=ON $M_2$=OFF | $M_1$=OFF $M_2$=ON |
|---|---|---|
| $M_3$=ON $M_4$=OFF | STATE [3] | STATE [1] |
| $M_3$=OFF $M_4$=ON | STATE [2] | STATE [4] |

DC-DC CONVERTER

CROSS REFERENCE TO RELATED APPLICATIONS

This application claims priority under 35 USC § 119 of Japanese Application Serial No. 2003-429,254, filed Dec. 25, 2003.

FIELD OF THE INVENTION

The present invention pertains to a DC—DC converter used to convert an input DC (direct current) power to a different DC (direct current) power.

DC—DC converters are small, light, and highly efficient DC power supplies using semiconductor switching elements. They are widely used for electronic devices, etc. In recent years, there has been a strong demand for smaller size, lighter weight, and higher efficiency. The basic working theory of DC—DC converters is that the switching elements are turned on/off at high frequency, and the ratio of the on time and off time, that is, the duty ratio, is controlled in a variable manner to keep the DC output voltage at a certain level. The so-called non-isolating or chopper type DC—DC converters can be classified into 3 types, that is, the step-up type that can generate an output voltage higher than the input voltage, the step-down type that can generate an output voltage lower than the input voltage, and the step-up/step-down type that can generate a constant output voltage independent of the input voltage.

In general, in a step-up/step-down DC—DC converter, an inductance element, for example, a choke coil, is connected in series or in parallel with the voltage output terminal, and the state of storing energy from the input side into the choke coil (referred to as "state A" hereinafter) and the state of releasing energy from the choke coil to the output side (referred to as "state B" hereinafter) are repeated alternately. State A is further divided into state A1, where energy is also supplied to the output side while storing energy from the input side into the choke coil, and state A2, where no energy is supplied to the output side and energy is only stored into the choke coil. A certain output voltage independent of the change in the input voltage can be output by controlling the ratio of the periods of said states A1 and A2.

Since the step-up/step-down type has bigger switching loss (power loss) than the step-up type and the step-down type, it is preferred to use this type only when the input and output voltages are close to each other. In practical application, the output voltage of a battery input to a DC—DC converter gradually drops from the fully charged level, for example, 4 V, during the period when power is supplied at the rated power supply voltage, for example, 3 V, from the DC—DC converter to the load. In this case, the step-down type (or step-down mode) is used until the output voltage of the battery drops to a level close to the rated value (3 V), for example, 3.3 V, and then the converter is switched to the step-up/step-down type (or step-up/step-down mode). Also, after the output voltage of the battery reaches a prescribed level lower than the rated value (3 V), for example, 2.8 V, it is also possible to switch the converter from the step-up/step-down type (or step-up/step-down mode) to the step-up type (or step-up mode).

BACKGROUND OF THE INVENTION

However, there is room for improvement in the ripple of the output voltage and the peak value (peak-to-peak value) of the current (coil current) flowing through the inductance element in the conventional step-up/step-down type DC—DC converter. Electronic devices, especially portable electronic devices, are required to operate at low power supply voltages in order to cut power consumption. A stable output voltage (power supply voltage) with a small ripple is required for the DC—DC converter used as the DC power supply of such an electronic device. Also, a larger peak value of the coil current requires the use of an inductance element with larger rated current (that is, larger size), which also increases switching loss. Therefore, it is necessary to develop technology that can reduce the peak value of the coil current as much as possible.

SUMMARY OF THE INVENTION

The purpose of the present invention is to solve the aforementioned problems of the aforementioned conventional technology by providing a DC—DC converter that can reduce the peak value of the current flowing through the inductance element and that can suppress the ripple in the output current.

In order to realize the aforementioned purpose, the first DC—DC converter disclosed in the present invention has the following: a first switching element connected between a voltage input terminal and one of the terminals of an inductance element; a second switching element connected between a reference potential and one of the terminals of the aforementioned inductance element; a third switching element connected between a voltage output terminal and the other terminal of the aforementioned inductance element; a fourth switching element connected between the reference potential and the other terminal of the aforementioned inductance element; and a control unit, which controls the switching of the aforementioned first, second, third, and fourth switching elements such that in the first state, the first switching element is off, the second switching element is on, the third switching element is on, and the fourth switching element is off; in the second state, the first switching element is on, the second switching element is off, the third switching element is off, and the fourth switching element is on; in the third state, the first switching element is on, the second switching element is off, the first switching element is on, and the fourth switching element is off; and in the fourth state, the first switching element is off, the second switching element is on, the third switching element is off, and the fourth switching element is on; and these states are repeated in a prescribed order.

In the aforementioned configuration, in the first state, one of the terminals of the inductance element is connected to the ground potential via the second switching element in the on state, and the other terminal of the inductance element is connected to the voltage output terminal via the third switching element in the on state. Energy is released from the inductance element to the voltage output terminal, and the current flowing through the inductance element (coil current) falls at a certain steep slope or decreases over time. In the second state, one of the terminals of the inductance element is connected to the voltage input terminal via the first switching element in the on state, and the other terminal of the inductance element is connected to the ground potential via the fourth switching element in the on state. Energy from the voltage input terminal is stored in the inductance element, and the coil current rises at a certain steep slope or increases over time. In the third state, one of the terminals of the inductance element is connected to the voltage input terminal via the first switching element in the on state, and the other terminal of the inductance element is connected to the voltage output terminal via the third switching element in the on state. Energy is released from the inductance element to the voltage output terminal while the energy from the voltage input terminal is stored in the inductance element. The coil current stays at an almost constant level immediately after switching if the input and output voltages are close to each other, and rises or falls at a slope corresponding to the ratio of magnitudes if the input and output voltages are significantly different from each other. In the fourth state, one of the terminals of the inductance element is connected to the ground potential via the second switching element in the one state, while the other terminal of the inductance element is connected to the ground potential via the fourth switching element in the on state. The coil current stays at an almost constant level immediately after the switching, irrespective of the ratio of magnitudes between the input and output voltages. When the aforementioned first, second, third, and fourth states are repeated, in particular, when the fourth state is included in one cycle, the variation or peak level of the coil current can be reduced. When the peak level of the coil current is reduced, the ripple in the output voltage can also be reduced.

According to a preferable embodiment of the present invention, the four states are repeated in an order such that the fourth state comes after the aforementioned third state with one state, either the first or the second state, inserted between them, and the third state comes after the fourth state with the other state, either the first or the second state, inserted between them. In this case, since the first state, in which the coil current drops sharply, and the second state, in which the coil current rises sharply, are not arranged in succession, in particular, since the fourth state, in which the coil current stays almost unchanged unconditionally, is inserted between the first and second states, the deflection point or the peak level of the coil current is effectively dulled or suppressed, and the peak level can be further reduced.

In the present invention, the variation or peak level of the coil current can be reduced if the period of the third and fourth states is longer than the period of the first and second states.

In the present invention, preferably, the control unit turns on/off the first and second switching elements in a complementary manner using pulse width control corresponding to the input voltage input to the aforementioned voltage input terminal, and turns on/off the third and fourth switching elements in a complementary manner using pulse width control corresponding to the output voltage output from the aforementioned voltage output terminal. The duty ratio of the first, second, third, and fourth states can be controlled in an optimum way in terms of the input and output voltages by the aforementioned two systems of pulse width control.

The second DC—DC converter of the present invention has the following: a first switching element connected between a voltage input terminal and one of the terminals of an inductance element; a second switching element connected between a reference potential and one of the terminals of the aforementioned inductance element; a third switching element connected between a voltage output terminal and the other terminal of the aforementioned inductance element; a fourth switching element connected between the reference potential and the other terminal of the aforementioned inductance element; a first control circuit, which compares the voltage level of a feed forward signal corresponding to the input voltage to the aforementioned voltage input terminal and a first reference voltage to the voltage level of a first triangular signal having a prescribed frequency, and turns on/off the first and second switching elements in a complementary manner corresponding to the comparison result; a second control circuit, which compares the voltage level of a feedback signal corresponding to the output voltage from the aforementioned voltage output terminal and a second reference voltage to the voltage level of a second triangular signal having the aforementioned prescribed frequency, and turns on/off the third and fourth switching elements in a complementary manner corresponding to the comparison result. The polarity or phase relationship between the aforementioned first and second triangular signals is set such that in the first state, the first switching element is off, the second switching element is on, the third switching element is on, and the fourth switching element is off; in the second state, the first switching element is on, the second switching element is off, the third switching element is off, and the fourth switching element is on; in the third state, the first switching element is on, the second switching element is off, the first switching element is on, and the fourth switching element is off; and in the fourth state, with the first switching element is off, the second switching element is on, the third switching element is off, and the fourth switching element is on; wherein all of the states occur in a prescribed order in on period of the aforementioned first or second triangular signal.

In the aforementioned configuration, in order to repeat the first, second, third, and fourth states in a prescribed order, the first control circuit compares the voltage level of the feed forward signal to the first triangular signal having a prescribed frequency and turns on/off the first and second switching elements in a complementary manner corresponding to the comparison result. Meanwhile, the second control circuit compares the voltage level of the feedback signal to the voltage level of the second triangular signal having the aforementioned prescribed frequency, and turns on/off the third and fourth switching elements in a complementary manner corresponding to the comparison result. In this case, the feed forward signal is generated from the input voltage and the first reference voltage, while the feedback signal is generated from the output voltage and the second reference voltage.

In the second DC—DC converter, in order to reduce the variation or peak level of the coil current, it is also preferred to repeat the four states in such an order that the fourth state comes after the aforementioned third state, with one of the states, either the first or second state, inserted between them, and the third state comes after the fourth state, with the other state, either the first or second state, inserted between them. Also, the period of the third and fourth states is preferably longer than the period of the first and second states. Consequently, it is preferred that the peak point of the first triangular signal occurs at the same time as or close to the peak point of the second triangular signal on the time axis. Also, it is preferred that the third or fourth state occur at the time when the first and second triangular signals pass through their respective peak points.

According to a preferred embodiment of the present invention, the maximum peak point and the minimum peak point of the first triangular signal occur at the same time as or close to the minimum peak point and the maximum peak point of the second triangular signal on the time axis, respectively, and the switching is controlled in the following way. When the voltage level of the aforementioned feed forward signal is higher than the voltage level of the first triangular signal, the first switching element is off and the second switching element is on. When the voltage level of the aforementioned feed forward signal is lower than the voltage level of the first triangular signal, the first switching element is on and the second switching element is off. When the voltage level of the aforementioned feed forward signal is higher than the voltage level of the second triangular signal, the third switching element is on and the fourth switching element is off. When the voltage level of the aforementioned feed forward signal is lower than the voltage level of the second triangular signal, the third switching element is off and the fourth switching element is on. In this way, the first, second, third, and fourth states can be repeated in a preferred order.

According to another preferred embodiment of the present invention, the maximum peak point and the minimum peak point of the first triangular signal occur at the same time as or close to the minimum peak point and the maximum peak point of the second triangular signal on the time axis, respectively, and the switching is controlled in the following way. When the voltage level of the aforementioned feed forward signal is higher than the voltage level of the first triangular signal, the first switching element is on and the second switching element is off. When the voltage level of the aforementioned feed forward signal is lower than the voltage level of the first triangular signal, the first switching element is off and the second switching element is on. When the voltage level of the aforementioned feed forward signal is higher than the voltage level of the second triangular signal, the third switching element is off and the fourth switching element is on. When the voltage level of the aforementioned feed forward signal is lower than the voltage level of the second triangular signal, the third switching element is on and the fourth switching element is off. In this way, the first, second, third, and fourth states can be repeated in a preferred order.

According to yet another preferred embodiment of the present invention, the maximum peak point and the minimum peak point of the first triangular signal occur at the same time or close to the maximum peak point and the minimum peak point of the second triangular signal on the time axis, respectively, and the switching is controlled in the following way. When the voltage level of the aforementioned feed forward signal is higher than the voltage level of the first triangular signal, the first switching element is off and the second switching element is on. When the voltage level of the aforementioned feed forward signal is lower than the voltage level of the first triangular signal, the first switching element is on and the second switching element is off. When the voltage level of the aforementioned feed forward signal is higher than the voltage level of the second triangular signal, the third switching element is off and the fourth switching element is on. When voltage level of the aforementioned feed forward signal is lower than the voltage level of the second triangular signal, the third switching element is on and the fourth switching element is off. In this way, the first, second, third, and fourth states can be repeated in a preferred order.

According to yet another preferred embodiment of the present invention, the maximum peak point and the minimum peak point of the first triangular signal occur at the same time or close to the maximum peak point and the minimum peak point of the second triangular signal on the time axis, respectively, and the switching is controlled in the following way. When the voltage level of the aforementioned feed forward signal is higher than the voltage level of the first triangular signal, the first switching element is on and the second switching element is off. When the voltage level of the aforementioned feed forward signal is lower than the voltage level of the first triangular signal, the first switching element is off and the second switching element is on. When the voltage level of the aforementioned feed forward signal is higher than the voltage level of the second triangular signal, the third switching element is on and the fourth switching element is off. When voltage level of the aforementioned feed forward signal is lower than the voltage level of the second triangular signal, the third switching element is off and the fourth switching element is on. In this way, the first, second, third, and fourth states can be repeated in a preferred order.

REFERENCE NUMERALS AND SYMBOLS AS SHOWN IN THE DRAWINGS

In the figures, M1 represents a first switching element, M2 a second switching element, M3 a third switching element, M4 a fourth switching element, L a choke coil (inductance element), 10 a control unit, 14, 16 inverters, 18 a feed forward control circuit, 20 a feedback control circuit, 30 an input voltage monitoring circuit, 32 a PWM comparator, 34 a triangular signal generating circuit, 44 an error signal detecting circuit, 46 a PWM comparator and 48 an inverted triangular signal generating circuit.

DETAILED DESCRIPTION OF THE DRAWINGS

Since the DC—DC converter of the present invention has the aforementioned configuration and effect, the peak level of the current flowing through the inductance element can be reduced, and the ripple in the output voltage can be kept to a minimum.

Best Embodiments of the Present Invention

In the following, the preferred embodiments of the present invention will be explained with reference to the attached figures.

Figures 1, 2:
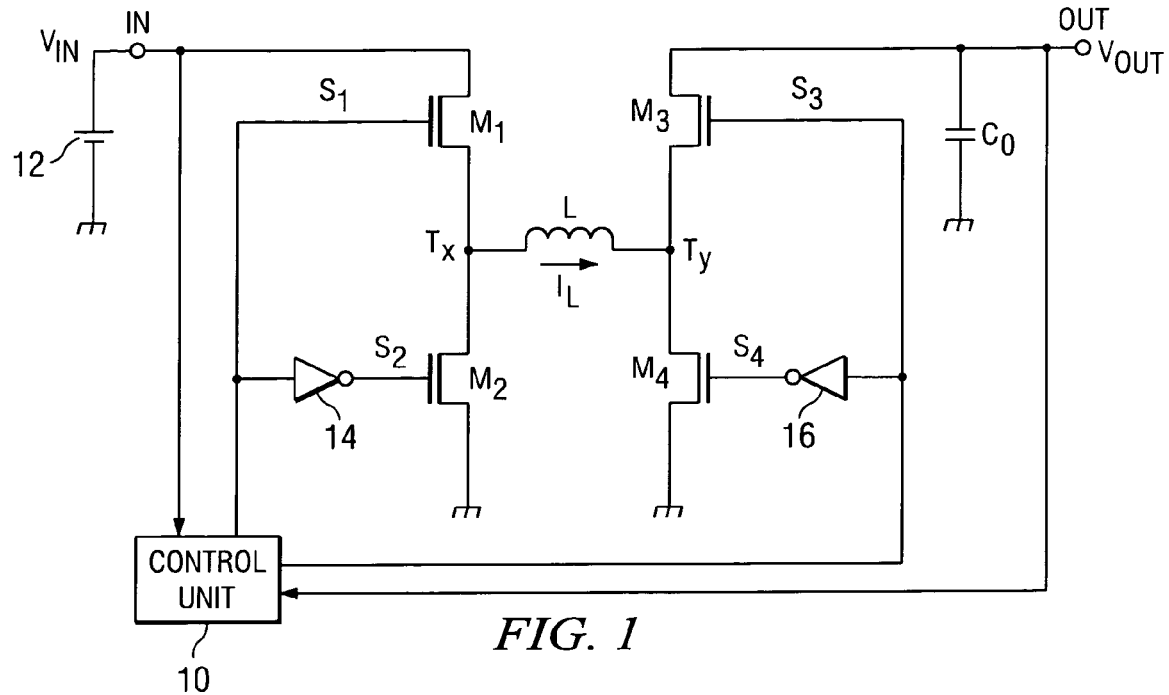
FIG. 1 is a circuit diagram illustrating the basic configuration of the DC—DC converter disclosed in the present invention.
FIG. 2 is a diagram illustrating the relationship between the on/off states of the switching elements and the four states in the present invention.

FIG. 1 shows the basic configuration of the DC—DC converter disclosed in the present invention. This DC—DC converter has the configuration of the so-called H bridge type switching regulator. It includes one inductor L, for example, a choke coil, four switching elements M1, M2, M3, M4, for example, MOSFETs, and a control unit 10 that controls the on/off state of said switching elements M1, M2, M3, M4.

Switching element M1 is connected between voltage input terminal IN, which receives a DC input voltage Vin coming from battery 12, and one terminal Tx of choke coil L. Switching element M2 is connected between terminal Tx of choke coil and the ground potential. Switching element M3 is connected between the other terminal Ty of choke coil L and voltage output terminal OUT. Switching element M4 is connected between terminal Ty of choke coil L and the ground potential. Capacitor Co connected between voltage output terminal OUT and the ground potential is used for smoothing.

Control unit 10 applies a binary logical control signal S1 to the control terminal of switching element M1 and applies control signal S2 obtained by inversing S1 using inverter 14 to the control terminal of switching element M2. When S1=level H and S2=level L, switching element M1 is on, while switching element M2 is off. When S1=level L and S2=level H, switching element M1 is off, while switching element M2 is on.

Also, control unit 10 applies a binary logic control signal S3 to the control terminal of the switching element and applies control signal S4 obtained by inverting S3 using inverter 16 to the control terminal of switching element M4. When S3=level H and S4=level L, switching element M3 is on, while switching element M4 is off. When S3=level L and S4=level H, switching element M3 is off, while switching element M4 is off.

In this DC—DC converter, as shown in FIGS. 2 and 3, four conductive states, or states [1], [2], [3], [4] are obtained corresponding to different combinations of the on/off states of switching elements M1, M2, M3, M4 around chock coil L.

Figure 3A:
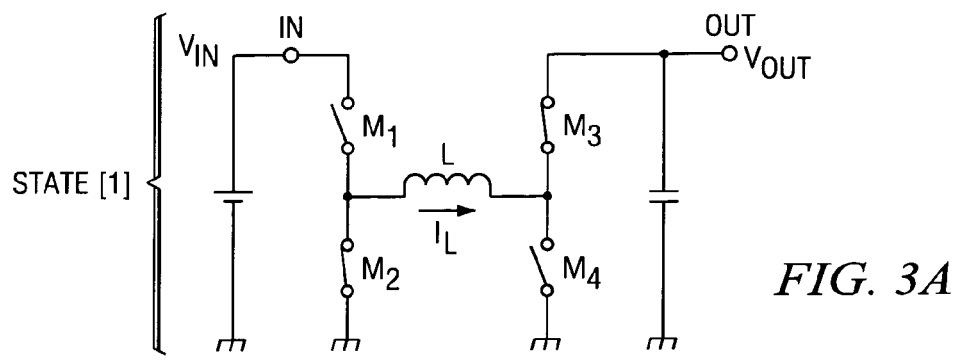
FIG. 3 is a diagram illustrating the four conductive states in the present invention.

More specifically, when (M1, M2)=(off, on) and (M3, M4)=(on, off), state [1] shown in FIG. 3(A) is reached. Terminals Tx and Ty of choke coil L are switched to the ground potential and voltage output terminal OUT, respectively. In state [1], energy is released from choke coil L to the voltage output terminal OUT. The current flowing through choke coil L or coil current IL falls at a certain steep slope or decreases over time.

Figure 3B:
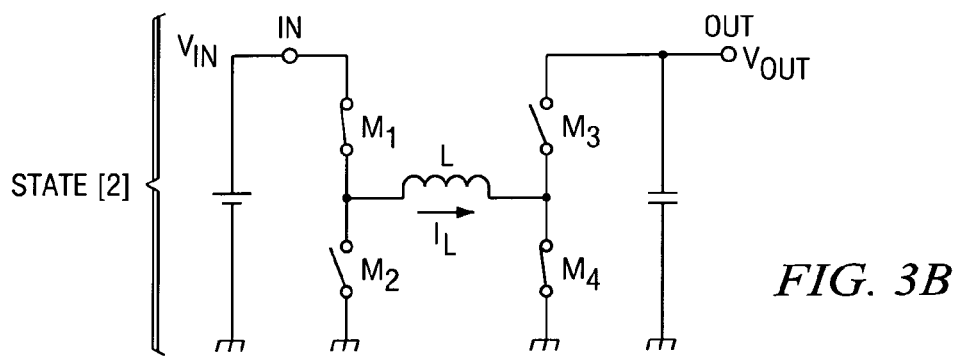

When (M1, M2)=(on, off) and (M3, M4)=(off, on), state [2] shown in FIG. 3(B) is reached. Terminals Tx and Ty of choke coil L are switched to the voltage input terminal IN and the ground potential, respectively. In state [2], energy from the voltage input terminal IN is stored into choke coil L. The coil current IL rises at a certain steep slope or increases over time.

Figure 3C:
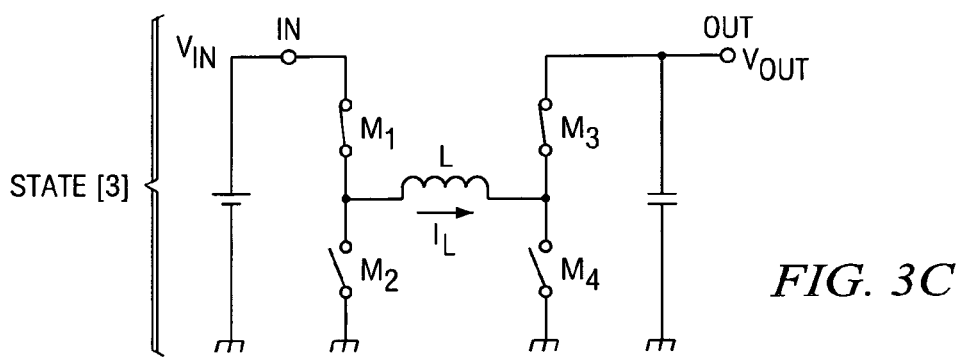

When (M1, M2)=(on, off) and (M3, M4)=(on, off), state [3] shown in FIG. 3(C) is reached. Terminals Tx and Ty of choke coil L are switched to the voltage input terminal IN and the voltage output terminal OUT, respectively. In state [3], when input voltage Vin is much higher than output voltage Vout, the energy from the voltage input terminal IN is also supplied to the voltage output terminal OUT at the same time as it is stored in choke coil L, and coil current IL rises at a certain slope over time. On the other hand, if input voltage Vin is much lower than output voltage Vout, energy is released from choke coil L to the voltage output terminal OUT, and coil current IL decreases at a certain slope over time. The slope for coil current IL to drop into state [3] or rise into state [4] is usually smaller than the slope for the current to drop or rise into states [1], [2]. In addition, in state [3], when input voltage Vin is close to output voltage Vout, coil current IL stays at an almost constant level (current immediately after the switching).

Figure 3D:
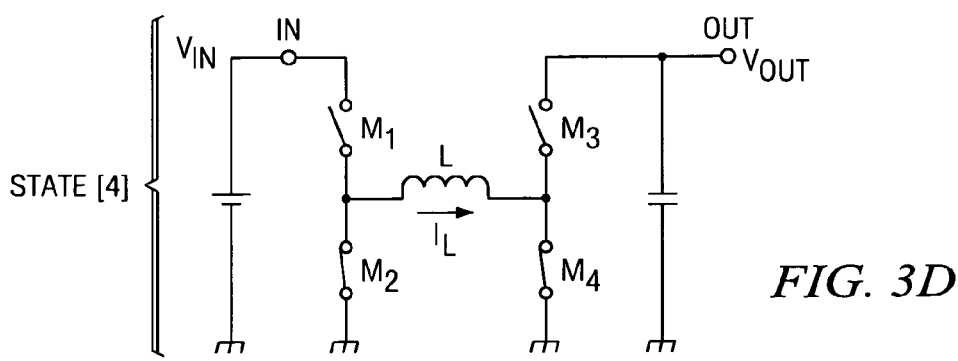

When (M1, M2)=(off, on) and (M3, M4)=(off, on), state [4] shown in FIG. 3(D) is reached. Both terminals Tx and Ty of choke coil L are switched to the ground potential. In state [4], coil current IL flows continuously in a loop through ground while nearly maintaining the level immediately after the switch independent of input voltage Vin or output voltage Vout.

Control unit 10 controls the on/off states of switching elements M1, M2, M3, M4 in such a way that said four states [1], [2], [3], [4] are repeated in a prescribed order.

Figure 4:
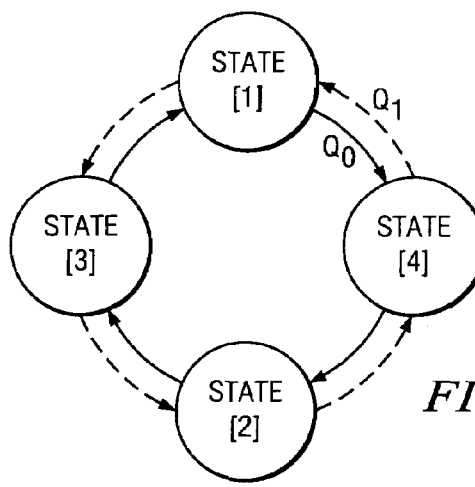
FIG. 4 is a diagram illustrating the transition sequence between the four states in the present invention.

In this case, as the first condition for reducing the peak level of coil current IL, as show in FIG. 4, the order that inserts states [3], [4] between alternating states of [1] and [2], that is, order Q0 . . . [1]→[4]→[2]→[3]→[1] . . . or order Q1 . . . [1]→[3]→[2]→[4]→[1] . . . is preferred. As described above, coil current IL drops at a steep slope in the period of state [1], rises at a steep slope in the period of state [2], and drops or rises at a relatively gentle changing rate or keeps the current level immediately after the switching in the periods of states [3], [4]. For said orders Q0 and Q1, since the first state [1], in which the coil current drops sharply, and the second state [2], in which the coil current rises sharply, are not arranged in succession, in particular, since the fourth state [4], in which the coil current IL stays almost unchanged unconditionally, is inserted between the first and second states [1], [2], the deflection point or the peak level of the coil current IL is effectively dulled or suppressed, and the peak level can be further reduced. Also, when the peak level of coil current IL is reduced, the ripple in output voltage Vout can also be reduced.

Figure 5:
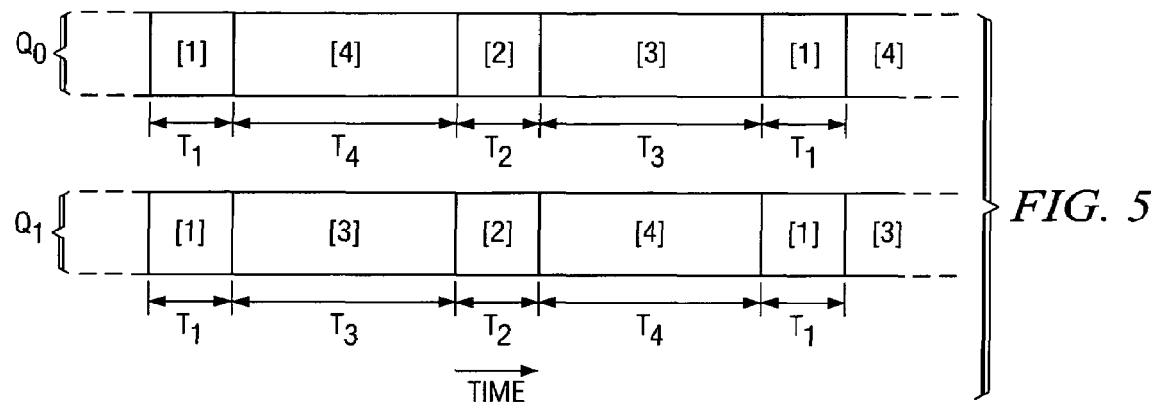
FIG. 5 is a diagram illustrating a preferred magnitude relationship over time between the four states in the present invention.

As the second condition for reducing the peak level of coil current IL, as shown in FIG. 5, it is preferred to prolong the periods T3, T4 of states [3], [4] as much as possible compared with the periods T1, T2 of states [1], [2]. During one cycle in which the four states [1], [2], [3], [4] occur in said order Q0 or Q1, if the periods T1, T2 of states [1], [2], in which coil current IL changes sharply, are kept relatively short, there is virtually no change in coil current IL. When the periods T3, T4 of states [3], [4], in which the change in the coil current is relatively small if any, are kept relatively long, the variation or peak level of coil current IL can be reduced, and thus the ripple in output voltage Vout can be reduced.

In FIG. 1, in order to keep output voltage Vout at the set level, it is preferred that control unit 10 control the on/off states of switching elements M1, M2, M3, M4 corresponding to input voltage Vin and output voltage Vout. Usually, switching elements M1, M2 are turned on/off by feed forward control corresponding to the level of input voltage Vin, while switching elements M3, M4 are turned on/off by feedback control corresponding to the level of output voltage Vout. The embodiments described below disclose specific examples for conducting the step-up/step-down operation by combining the feed forward control and feedback control in the present invention.

Embodiment 1

Figure 6:
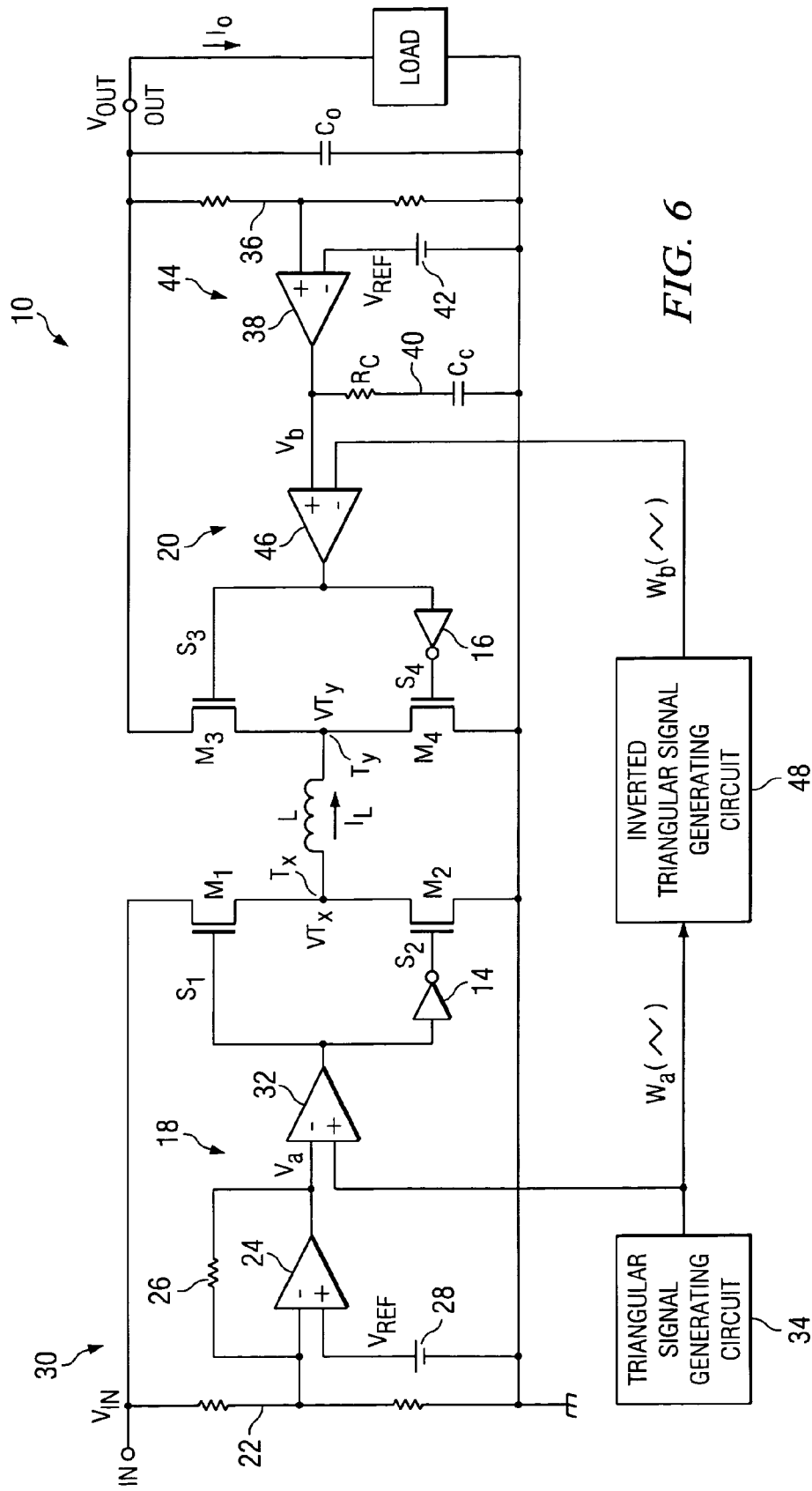
FIG. 6 is a circuit diagram illustrating the configuration of the DC—DC converter disclosed in the first embodiment.

FIG. 6 shows the circuit configuration of the step-up/step-down DC—DC converter disclosed in the first embodiment.

In this DC—DC converter, control unit 10 has feed forward control circuit 18 on the side of switching elements M1, M2 and feedback control circuit 20 on the side of switching elements M3, M4.

Feed forward control circuit 18 has input voltage monitoring circuit 30, PWM (pulse width modulation) comparator 32, and triangular signal generating circuit 34. In this case, input voltage monitoring circuit 30 has voltage-dividing resistor circuit 22, operational amplifier 24, feedback resistor 26, and reference voltage generating circuit 28. In input voltage monitoring circuit 30, coefficient Ka determined by the voltage-dividing ratio of the voltage-dividing resistor circuit 22 and the resistance of feedback resistor 26 is multiplied with the input voltage Vin, and this multiplication result is added to constant D corresponding to the reference voltage Vref generated by reference voltage generating circuit 28 to obtain a DC voltage, that is, feed forward signal Va corresponding to the calculation result (KaVin+D). The feed forward signal Va is input to input terminal (−) of comparator 32. On the other hand, a triangular signal with a prescribed frequency, such as 1 MHz, is input from triangular signal generating circuit 34 to input terminal (+) of comparator 32.

Comparator 32 compares the voltage level of feed forward signal Va and the voltage level of triangular signal Wa. If Va>Wa, an output voltage, that is, control signal S1 with level L is output. If Va<Wa, control signal S1 with level H is output. Like the reference circuit shown in FIG. 1, control signal S1 is sent to the control terminal of switching element M1, and control signal S2 obtained by inverting S1 using inverter 14 is sent to the control terminal of switching element M2.

Feedback control circuit 20 comprises error signal detecting circuit 44, PWM comparator 46, and inverted triangular signal generating circuit 48. In this case, error signal detecting circuit 44 has voltage-dividing resistor circuit 36, current output type amplifier 38, output circuit 40, and reference voltage generating circuit 42. Current output type amplifier 38 is a so-called gm amplifier with the output current controlled corresponding to the input voltage. The DC voltage KbVout obtained by dividing output voltage Vout at a prescribed voltage-dividing ratio Kb by resistance voltage-dividing circuit 36 is input to one of the input terminals, while the reference voltage Vref generated by reference voltage generating circuit 42 is input to the other input terminal. The error signal indicating the difference between the two voltages (KbVout-Vref) or feedback error signal Vb is output. Output circuit 40 comprises resistor Rc and capacitor Cc connected in series between the output terminal of current output type amplifier 38 and the ground potential and is used to adjust the gain or stabilize error signal Vb.

The feedback error signal Vb obtained at the output terminal of current output type amplifier 38 is input to input terminal (+) of comparator 46. On the other hand, inverted triangular signal generating circuit 48 generates inverted triangular signal Wb obtained by inverting the polarity of triangular signal Wa sent from triangular signal generating circuit 34. In this case, the polarity inversion of the triangular signal means that the voltage level of each point is inverted with reference to the average level of the triangular signal such that the maximum peak point is inverted to the minimum peak point, and the minimum peak point is inverted to the maximum peak point. If the waveform of triangular signal Wa is an equilateral triangle, when the phase is shifted by 180°, triangular signal Wb with inverted polarity is obtained. The inverted triangular signal Wb output from inverted triangular signal generating circuit 48 is input to the input terminal (−) of comparator 46.

Comparator 46 compares the voltage level of feedback error signal Vb and the voltage level of inverted triangular signal Wb. If Vb>Wb, an output voltage, that is, control signal S3 with level L is output. If Vb<Wb, control signal S3 with level L is output. Like the reference circuit shown in FIG. 1, control signal S3 is sent to the control terminal of switching element M3, while control signal S4 obtained by inverting S3 using inverter 16 is sent to the control terminal of switching element M4.

Figure 7:
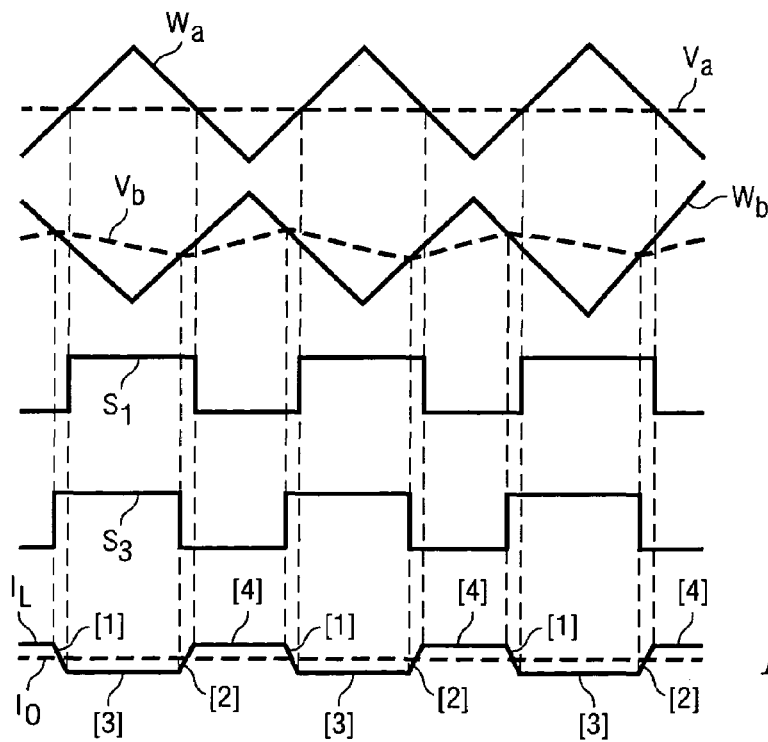
FIG. 7 is a diagram illustrating the waveform of each part in the DC—DC converter (an example) in this embodiment.

FIG. 7 shows the waveform of each part in the DC—DC converter (an example). In the example shown in the figure, input voltage Vin is almost the same as output voltage Vout (Vin≈Vout). In this case, feedback control circuit 20 controls the switching of the switching elements M3, M4 such that the average of coil current IL is equal to load current Io.

During the period when control signal S1 is at level L and control signal S3 is at level L, conductive state [1] is reached. Choke coil L is connected to the output side while it is blocked from the input side. Coil current IL drops at a sharp slope as shown in FIG. 7(E).

Before long, the magnitude relationship between input signals Va, Wa in PWM comparator 32 on the side of feed forward control circuit 18 is reversed from Va>Wa to Va<Wa, and control signal S1 changes from level L to level H (FIG. 7(A), (C)). As a result, both S1 and S3 become level H, and the state switches from state [1] to state [3]. In this case, when input voltage Vin is close to output voltage Vout, as shown in FIG. 7(E), coil current IL in state [3] almost keeps the current level (minimum peak level) obtained immediately after the state switch ([1]→[3]). During the period of state [3], the minimum or bottom peak current is retained in choke coil L, and output voltage Vout drops gradually as shown in FIG. 7(B).

Then, when the magnitude relationship between input signals Vb, Wb in PWM comparator 46 on the side of feedback control circuit 20 is reversed from Vb>Wb to Vb<Wb and the control signal changes from level H to low level L (FIG. 7(B), (D)), the state switches from state [3] to state [2]. In state [2], choke coil L receives energy from the input side while it is blocked from the output side. Coil current IL rises at a sharp slope as shown in FIG. 7(E).

Before long, the magnitude relationship between input signals Va, Wa of PWM comparator 32 on the side of feed forward control circuit 18 is reversed from Va<Wa to Va>Wa, and control signal S1 changes from level H to low level L (FIG. 7(A), (C)). As a result, both S1 and S3 become level L, and the state switches from state [2] to state [4]. In state [4], coil current IL flows continuously in a closed loop comprising the choke coil L and ground while maintaining the current level (maximum peak level) obtained immediately after the state switch ([2]→[4]). The output voltage Vout rises gradually on the output side as shown in FIG. 7(E).

Then, when the magnitude relationship between input signals Vb, Wb in PWM comparator 46 on the side of feedback control circuit 20 is reversed from Vb<Wb to Vb>Wb and control signal S3 changes from level L to level H (FIG. 7(B), (D)), the state returns to state [1] from state [4]. After that, the operation is repeated in the same way as described above in order Q1 of [1]→[3]→[2]→[4]→[1].

As shown in FIG. 7, four states [1], [2], [3], [4] occur in a prescribed order Q1 in one period of triangular signals Wa, Wb. Also, the variation or peak level of coil current IL can be reduced if the periods T1, T2 of states [1], [2] are shorter than the periods T3, T4 of states [3], [4] in one cycle.

In this embodiment, it is preferred that the maximum and minimum peak point of triangular signal Wa applied to PWM comparator 32 on the side of feed forward control circuit 18 coincide with the minimum and maximum peak points of triangular signal Wb applied to PWM comparator 46 on the side of feedback control circuit 20 on the time axis, respectively. If that condition is true, as can be seen from FIG. 7, the combined period of states [3] and [4] in the aforementioned one cycle can be maximized, while the combined period of states [1] and [2] can be minimized.

FIGS. 8 and 9 compare the improvement in the output voltage ripple and the peak level of the coil current achieved in this embodiment (FIG. 8) with a comparative example (FIG. 9). In the comparative example, inverted triangular signal generating circuit 48 is omitted in the DC—DC converter shown in FIG. 6. The triangular signal Wa applied to PWM comparator 32 on the side of feed forward control circuit 18 is applied directly to the inverting input terminal (−) of PWM comparator 46 on the side of feedback control circuit 20 without having its polarity inverted. Voltage VTx (FIG. 8 and FIG. 9(C) and VTy (FIG. 8 and FIG. 9(D)) are voltages at terminals Tx, Ty of choke coil L, respectively.

In this embodiment (FIG. 8), the peak level of coil current IL is reduced to 1/10 or even lower than that in the comparative example (FIG. 9), and the ripple in output voltage Vout is held low to the same degree. As shown in the figure, when load current Io is zero (A), the load enters the standby mode and operation halts. In the DC—DC converter, however, since the switching operation is continued, power is consumed by the switching elements. The switching loss is inversely proportional to the square of the peak level of coil current IL. Consequently, when the peak level of coil current IL is reduced significantly, not only is it possible to use a small-sized choke coil L with a minimal rated current, but the switching loss can also be reduced significantly.

Figure 8A:
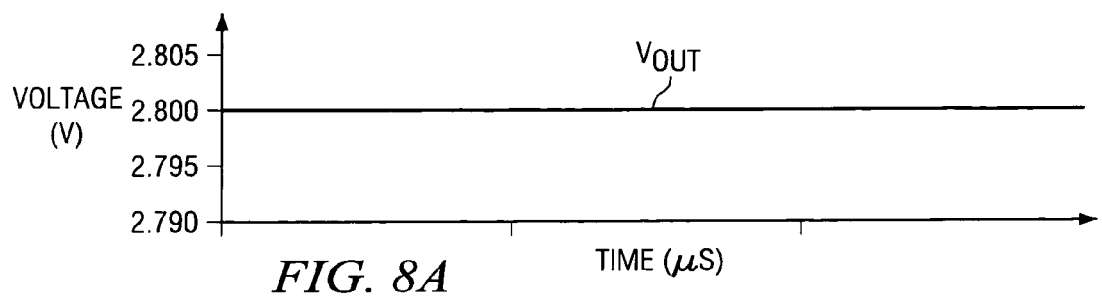
FIG. 8 is a diagram illustrating the simulated waveform of each part in the DC—DC converter disclosed in the embodiment.
Figure 8B:
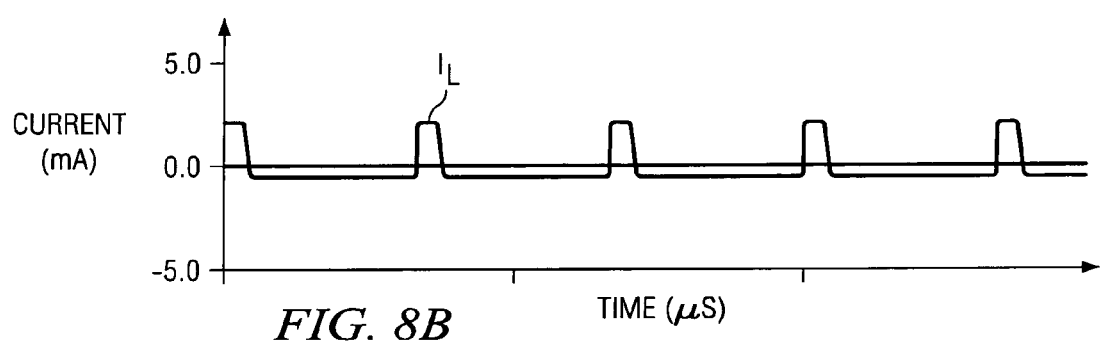
Figure 8C:
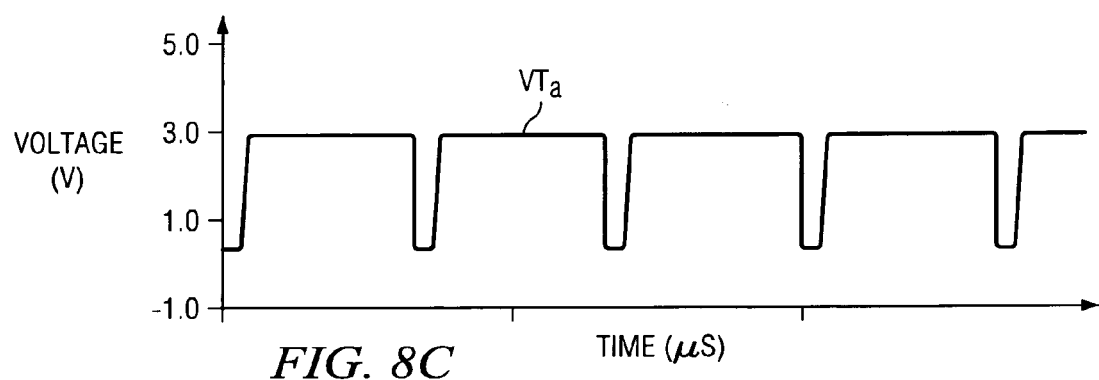
Figure 8D:
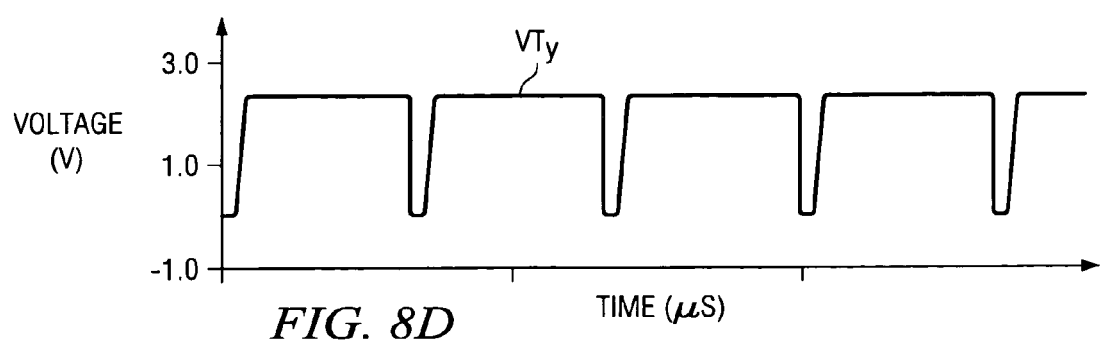
Figure 9A:
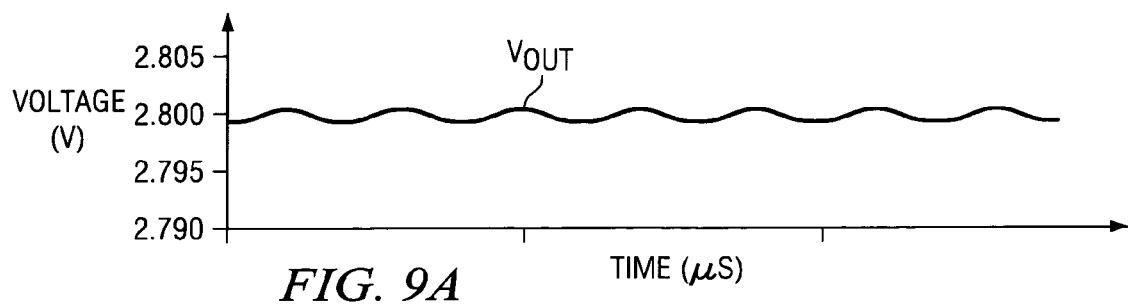
FIG. 9 is a diagram illustrating the simulated waveform of each part in the DC—DC converter disclosed in a comparative example.
Figure 9B:
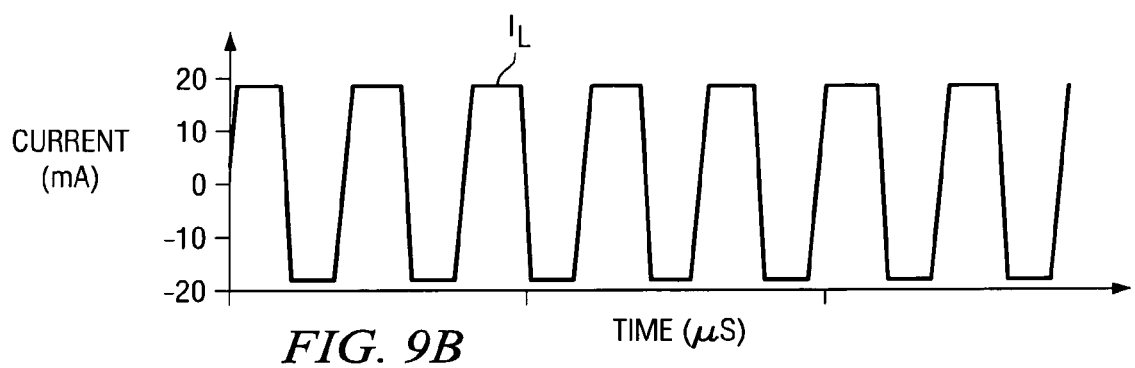
Figure 9C:
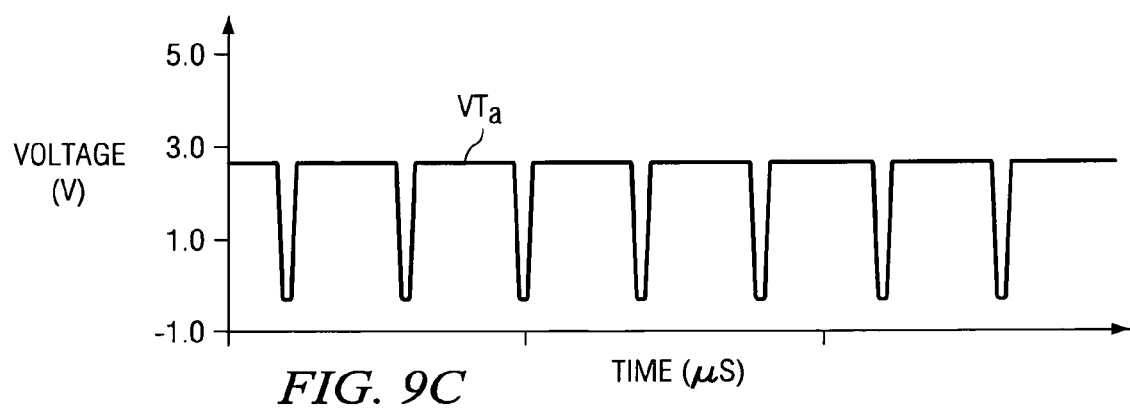
Figure 9D:
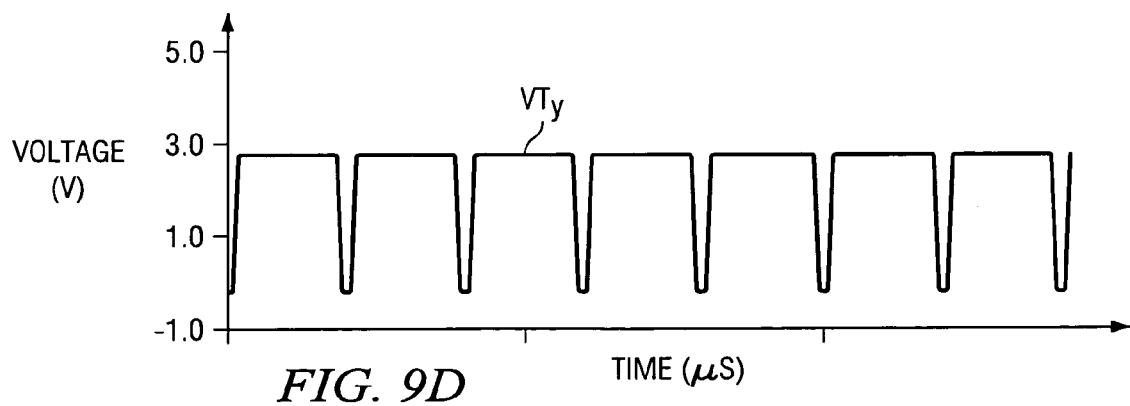

In this embodiment, as shown in FIG. 8(C), (D), under the condition of Vin≈Vout, the voltages at the two terminals Tx, Ty of choke coil L are almost in phase. On the other hand, in the comparative example, as shown in FIG. 9(C), (D), the voltages at the two terminals Tx, Ty of choke coil L have a phase difference (about 180°).

Figure 10:
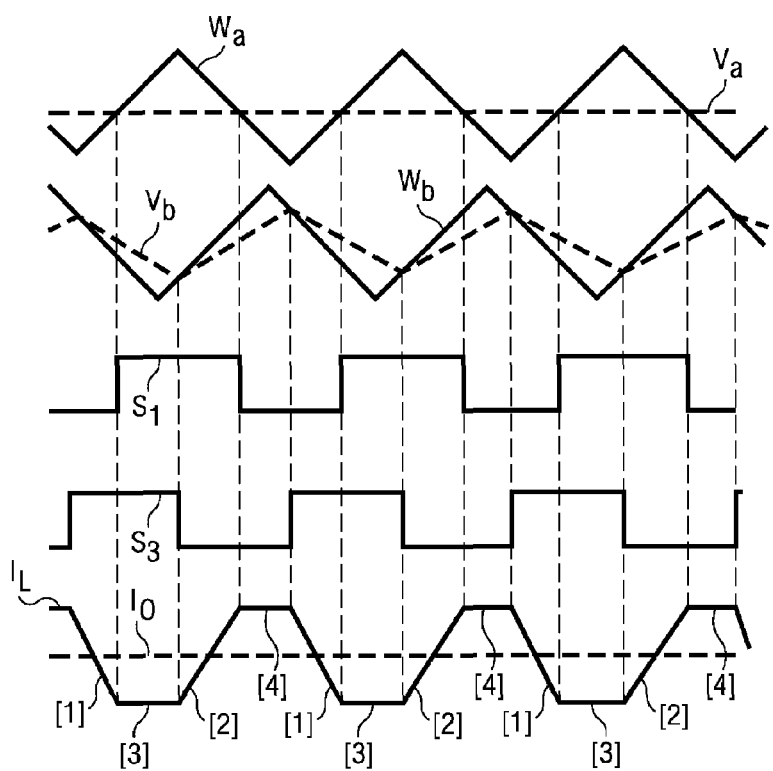
FIG. 10 is a diagram illustrating the waveform of each part in the DC—DC converter (another example) in this embodiment.

As described above, in this embodiment, the optimum phase relationship between the triangular signal Wa on the side of feed forward control circuit 18 and the triangular signal Wb [sic; Wa] on the side of feedback control circuit 20 is that the minimum and maximum peak points of triangular signal Wb coincide with the maximum and minimum peak points of triangular signal Wa on the time axis, respectively. If the phase relationship between two triangular signals Wa, Wb deviates from the aforementioned optimum condition, as shown in FIG. 10, the variation or peak level of coil current IL increases in proportion to the deviation amount (phase difference). Consequently, it is preferred that the phase relationship between two triangular signals Wa, Wb be as close as possible to the optimum condition (FIG. 7).

Embodiment 2

Figure 11:
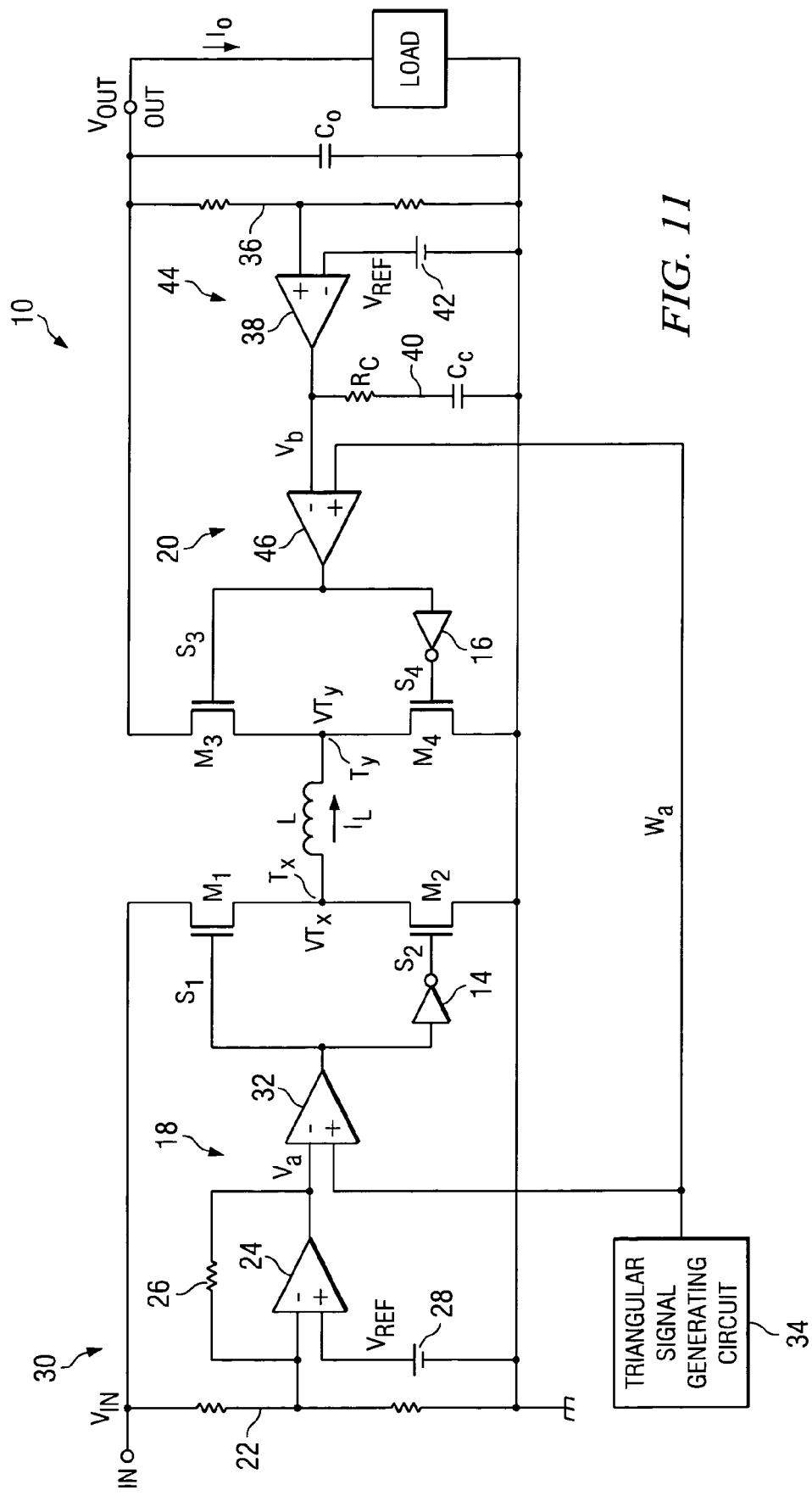
FIG. 11 is a circuit diagram illustrating the configuration of the DC—DC converter disclosed in the second embodiment.

FIG. 11 shows the circuit configuration of the step-up/step-down type DC—DC converter disclosed in the second embodiment. In the second embodiment, in the aforementioned DC—DC converter (FIG. 6) described in the first embodiment, inverted triangular signal generating circuit 48 is omitted, and the same triangular signal Wa as that applied to PWM comparator 32 on the side of feedforward control circuit 18 is applied to PWM comparator 46 on the side of feedback control circuit 20. However, triangular signal Wa is input to input terminal (+) of PWM comparator 46, while the feedback error signal Vb from error signal detecting circuit 44 is input to the other input terminal (−). Consequently, comparator 46 compares the voltage level of feedback error signal Vb with the voltage level of triangular signal Wa. If Vb>Wb, an output voltage, that is, control signal S3 with level L is output. If Vb<Wb, control signal S3 with level H is output. The rest of the configuration is exactly the same as that described in the first embodiment.

The preferred embodiments of the present invention have been explained above. The present invention, however, is not limited to these embodiments. Various types of modifications and variations can be made within the scope of its main technical teaching. For example, the parts or element technology used to build the DC—DC converter of the present invention can be substituted with other parts or element technology that have virtually the same functions. For example, P-channel MOS transistors, bipolar transistors, diodes, etc. can be used instead of MOSFET or N-channel MOS transistors as switching elements M1, M2, M3, M4. For example, when P channel MOS transistors are used as switching elements M1, M3 and N channel MOS transistors are used as switching elements M2, M4, inverters 14, 16 can be omitted. Other inductors besides choke coils can also be used as the inductance elements L.

Feed forward control circuit 18 (especially, input voltage monitoring circuit 30) or feedback control circuit (especially, error signal detecting circuit 44) may also have various types of modifications. For example, in the DC—DC converter (FIG. 6) disclosed in the first embodiment, the polarities of signals Va, Wa input to PWM comparator 32 on the side of feed forward circuit 18 can be reversed, that is, Wa is input to inverting input terminal (−), while Va is input to non-inverting input terminal (+). On the other hand, the polarities of signals Vb, Wb input to PWM comparator 46 on the side of feedback control circuit 20 can be reversed. That is, Vb is input to inverting input terminal (−), while Wb is input to non-inverting input terminal (+). In the DC—DC converter (FIG. 11) disclosed in the second embodiment, the polarities of the input signals input to both PWM comparators 32, 46 can also be reversed. Any type of triangular signal can be used in the DC—DC converter of the present invention. For example, sawtooth wave signals can be used. The triangular signal on the side of feed forward control circuit 18 may have a different amplitude from that on the side of feedback control circuit 20. Also, the aforementioned triangular signals are not necessarily strict triangular signals as long as they are synchronous signals. For example, they can be sinusoid signals.

The invention claimed is:

1. DC—DC converter having the following:
   a first switching element connected between a voltage input terminal and
   a first terminal of an inductance element;
   a second switching element connected between a reference potential and said first terminal;
   a third switching element connected between a voltage output terminal and a second terminal of said inductance element;
   a fourth switching element connected between the reference potential and said second terminal; and
   a control unit, which controls the switching of the aforementioned first, second, third, and fourth switching elements such that in a first state, the first switching element is off, the second switching element is on, the third switching element is on, and the fourth switching element is off; in a second state, the first switching element is on, the second switching element is off, the third switching element is off, and the fourth switching element is on; in a third state, the first switching element is on, the second switching element is off, the third switching element is on, and the fourth switching element is off, and in a fourth state, the first switching element is off, the second switching element is on, the third switching element is off, and the fourth switching element is on; and the state transitions are from first state to third state, from third state to second state, from second state to fourth state, and from fourth state to first state.

2. The DC—DC converter described in claim 1, characterized by the fact that a period of the third and fourth states is longer than a period of the first and second states.

3. The DC—DC converter described in claim 1, characterized by the fact that the aforementioned control unit turns on/off the first and second switching elements in a complementary manner using pulse width control corresponding to an input voltage to the aforementioned voltage input terminal and turns on/off the third and fourth switching elements in a complementary manner using pulse width control corresponding to an output voltage from the aforementioned voltage output terminal.

4. DC—DC converter characterized in that the converter has the following:
  a first switching element connected between a voltage input terminal and one of the terminals of an inductance element;
  a second switching element connected between a reference potential and one of the terminals of the aforementioned inductance element;
  a third switching element connected between a voltage output terminal and the other terminal of the aforementioned inductance element;
  a fourth switching element connected between the reference potential and the other terminal of the aforementioned inductance element;
  a first control circuit, which compares a voltage level of a feed forward signal corresponding to an input voltage to the aforementioned voltage input terminal and a first reference voltage with a voltage level of a first triangular signal having a prescribed frequency and which turns on/off the first and second switching elements in a complementary manner corresponding to a comparison result;
  a second control circuit, which compares the voltage level of a feedback signal corresponding to the output voltage from the aforementioned voltage output terminal and a second reference voltage with the voltage level of a second triangular signal having the aforementioned prescribed frequency and which turns on/off the third and fourth switching elements in a complementary manner corresponding to the comparison result;
  a polarity or phase relationship between the aforementioned first and second triangular signals is set such that in the first state, the first switching element is off, the second switching element is on, the third switching element is on, and the fourth switching element is off; in the second state, the first switching element is on, the second switching element is off, the third switching element is off, and the fourth switching element is on; in the third state, the first switching element is on, the second switching element is off, the first switching element is on, and the fourth switching element is off; and in the fourth state, the first switching element is off, the second switching element is on, the third switching element is off, and the fourth switching element is on; wherein the first, second, third, and fourth states occur in a prescribed order in one period of the aforementioned first or second triangular signal.

5. The DC—DC converter described in 4, characterized by having a feed forward signal generating circuit, which multiplies the aforementioned input voltage by a prescribed coefficient, then adds a prescribed constant to the multiplication result, and outputs the sum as the aforementioned feed forward signal.

6. The DC—DC converter described in claim 4, characterized by the fact that the fourth state comes after the aforementioned third state with either the first or second state inserted between them, and the third state comes after the fourth state with either the first or second state inserted between them.

7. The DC—DC converter described in claim 6, characterized by the fact that a peak point of the first triangular signal is occurs at the same time or close to the peak point of the second triangular signal on the time axis.

8. The DC—DC converter described in claim 7, characterized by the fact that the period of the third and fourth states is longer than the period of the first and second states.

9. The DC—DC converter described in claim 8, characterized by the fact that the aforementioned third or fourth state occurs at a time after the first and second triangular signals pass their respective peak points.

10. The DC—DC converter described in claim 8, characterized by the following facts: a maximum peak point and a minimum peak point of the first triangular signal occur at the same time or close to the minimum peak point and the maximum peak point of the second triangular signal on a time axis, respectively;
  when the voltage level of the aforementioned feed forward signal is higher than the voltage level of the first triangular signal, the first switching element is off and the second switching element is on;
  when the voltage level of the aforementioned feed forward signal is lower than the voltage level of the first triangular signal, the first switching element is on and the second switching element is off;
  when the voltage level of the aforementioned feed forward signal is higher than the voltage level of the second triangular signal, the third switching element is on and the fourth switching element is off;
  when the voltage level of the aforementioned feed forward signal is lower than the voltage level of the second triangular signal, the third switching element is off and the fourth switching element is on.

11. The DC—DC converter described in claim 8, characterized by the following facts: a maximum peak point and a minimum peak point of the first triangular signal occur at the same time or close to a minimum peak point and a maximum peak point of the second triangular signal on the time axis, respectively;
  when the voltage level of the aforementioned feed forward signal is higher than the voltage level of the first triangular signal, the first switching element is on and the second switching element is off;
  when the voltage level of the aforementioned feed forward signal is lower than the voltage level of the first triangular signal, the first switching element is off and the second switching element is on;

when the voltage level of the aforementioned feed forward signal is higher than the voltage level of the second triangular signal, the third switching element is off and the fourth switching element is on;

when the voltage level of the aforementioned feed forward signal is lower than the voltage level of the second triangular signal, the third switching element is on and the fourth switching element is off.

12. The DC—DC converter described in claim 8, characterized by the following facts: a maximum peak point and a minimum peak point of the first triangular signal occur at the same time or close to a maximum peak point and a minimum peak point of the second triangular signal on the time axis, respectively;

when the voltage level of the aforementioned feed forward signal is higher than the voltage level of the first triangular signal, the first switching element is off and the second switching element is on;

when the voltage level of the aforementioned feed forward signal is lower than the voltage level of the first triangular signal, the first switching element is on and the second switching element is off;

when the voltage level of the aforementioned feed forward signal is higher than the voltage level of the second triangular signal, the third switching element is off and the fourth switching element is on;

when the voltage level of the aforementioned feed forward signal is lower than the voltage level of the second triangular signal, the third switching element is on and the fourth switching element is off.

13. The DC—DC converter described in claim 8, characterized by the following facts: a maximum peak point and a minimum peak point of the first triangular signal occur at the same time or close to a maximum peak point and a minimum peak point of the second triangular signal on the time axis, respectively;

when the voltage level of the aforementioned feed forward signal is higher than the voltage level of the first triangular signal, the first switching element is on and the second switching element is off;

when the voltage level of the aforementioned feed forward signal is lower than the voltage level of the first triangular signal, the first switching element is off and the second switching element is on;

when the voltage level of the aforementioned feed forward signal is higher than the voltage level of the second triangular signal, the third switching element is on and the fourth switching element is off;

when the voltage level of the aforementioned feed forward signal is lower than the voltage level of the second triangular signal, the third switching element is off and the fourth switching element is on.

* * * * *